US011078976B2

(12) United States Patent
Yokoyama (10) Patent No.: US 11,078,976 B2
(45) Date of Patent: Aug. 3, 2021

(54) DISC BRAKE

(71) Applicant: TOYOTA JIDOSHA KABUSHIKI KAISHA, Toyota (JP)

(72) Inventor: Tomohiro Yokoyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/434,798

(22) Filed: Jun. 7, 2019

(65) Prior Publication Data

US 2020/0011387 A1 Jan. 9, 2020

(30) Foreign Application Priority Data

Jul. 6, 2018 (JP) .............................. JP2018-128883

(51) Int. Cl.
*F16D 55/226* (2006.01)
*F16D 65/18* (2006.01)
*B60T 1/06* (2006.01)
*F16D 127/02* (2012.01)
*F16D 121/04* (2012.01)

(52) U.S. Cl.
CPC .......... *F16D 55/2262* (2013.01); *B60T 1/065* (2013.01); *F16D 65/183* (2013.01); *F16D 2121/04* (2013.01); *F16D 2127/02* (2013.01)

(58) Field of Classification Search
CPC ............. F16D 2125/10; F16D 55/2262; F16D 55/2265; F16D 2121/04; F16D 65/097; F16D 65/0972; F16D 65/0975; F16D 65/0976; F16D 65/0977; F16D 65/0978; F16D 65/0979; F16D 2127/02; F16D 2055/0029; F16D 2055/0016; (Continued)

(56) References Cited

U.S. PATENT DOCUMENTS 3,421,602 A * 1/1969 Craske .................. F16D 55/226
188/73.43
3,480,116 A * 11/1969 Rath .................... F16D 65/0977
188/73.43

(Continued)

FOREIGN PATENT DOCUMENTS

CN 110017341 A 7/2019
DE 2657297 A1 * 6/1977 ........... F16D 55/226

(Continued)

*Primary Examiner* — Bradley T King
*Assistant Examiner* — Stephen M Bowes
(74) *Attorney, Agent, or Firm* — Sughrue Mion, PLLC (57) ABSTRACT

A disc brake of a floating type includes: an inner pad and an outer pad respectively located on opposite sides of a rotor rotatable with a wheel; a pressing device configured to press the inner pad and the outer pad against the rotor; and a housing mounted on a non-rotating member and holding the pressing device. The pressing device includes: a first pressing member movable toward the rotor; a second pressing member movable away from the rotor; and a frame having a substantially frame shape and including (i) a first side portion opposed to the second pressing member and (ii) a second side portion engaged with the outer pad and movable together with the outer pad in a direction parallel with a rotation axis of the rotor. The disc brake includes a return spring provided between the frame and one of the housing and the inner pad.

4 Claims, 11 Drawing Sheets

(58) Field of Classification Search
CPC ....... F16D 2055/002; F16D 2055/0025; F16D 2055/0041; F16D 65/0068; F16D 65/0075
See application file for complete search history.

(56) References Cited

U.S. PATENT DOCUMENTS

| | | | | |
|---|---|---|---|---|
| 3,525,420 | A | * | 8/1970 | Cochrane .............. F16D 55/226 188/72.4 |
| 3,661,232 | A | * | 5/1972 | Kondo ................ F16D 55/2262 188/73.45 |
| 3,692,151 | A | * | 9/1972 | Kobayashi .......... F16D 55/2262 188/72.5 |
| 6,695,099 | B1 | * | 2/2004 | Waag .................... F16D 55/228 188/70 R |
| 2016/0195148 | A1 | | 7/2016 | Shin et al. |
| 2019/0178320 | A1 | | 6/2019 | Yokoyama |

FOREIGN PATENT DOCUMENTS

| | | | |
|---|---|---|---|
| GB | 1528124 A | * 10/1978 | ........... F16D 55/226 |
| JP | 55-175641 U1 | 12/1980 | |
| JP | 2015-055260 A | 3/2015 | |
| JP | 2016-125659 A | 7/2016 | |

\* cited by examiner

FIG.5    INNER SIDE IN VEHICLE ⟵⟶ OUTER SIDE IN VEHICLE

FIG.6

LINE CONNECTING RADIALLY OUTER EDGES OF INNER PAD 4

DISC BRAKE

CROSS REFERENCE TO RELATED APPLICATION

The present application claims priority from Japanese Patent Application No. 2018-128883, which was filed on Jul. 6, 2018, the disclosure of which is herein incorporated by reference in its entirety.

BACKGROUND

The following disclosure relates to a disc brake mounted on a wheel of a vehicle.

Patent Document 1 (Japanese Unexamined Utility Model (Registration) Application Publication No. 55-175641) discloses a disc brake including: an inner pad and an outer pad respectively located on opposite sides of a rotor rotatable with a wheel; and a pressing device configured to press the inner pad and the outer pad against the rotor and including a wheel cylinder and a frame as a caliper movable in a direction parallel with the rotation axis of the rotor. Patent Document 2 (Japanese Patent Application Publication No. 2016-125659) discloses a disc brake in which a pad liner having an elastic portion is mounted in a caliper, and the elastic portion is brought into contact with the inner pad and the outer pad. In the case where the disc brake is switched from an operating state to a non-operating state, the elastic portion separates the inner pad and the outer pad from the rotor. This reduces brake drag. The pad liner extends over the rotor toward outer and inner sides of the rotor.

SUMMARY

Accordingly, an aspect of the disclosure relates to a disc brake including a pressing device having a frame, and capable of reducing brake drag.

In one aspect of the disclosure, a disc brake is configured such that a frame having a substantially frame shape is held by a housing mounted on a non-rotating member so as to be movable relative to the housing in a direction parallel with a rotation axis of a rotor. A return spring is provided between the frame and an inner pad or the housing. When the disc brake is operated, a first pressing member is moved toward the rotor to press the inner pad against the rotor, and a second pressing member is moved away from the rotor to move the frame to press an outer pad against the rotor. When the disc brake is released, a piston seal returns the first pressing member and the second pressing member to their respective initial positions, and the return spring returns the frame to its initial position, so that the outer pad is separated from the rotor. This separates the inner pad from the rotor well. As a result, brake drag is reduced.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Hereinafter, there will be described disc brakes each provided for a wheel of a vehicle according to embodiments by reference to the drawings.

First Embodiment

Figure 1:
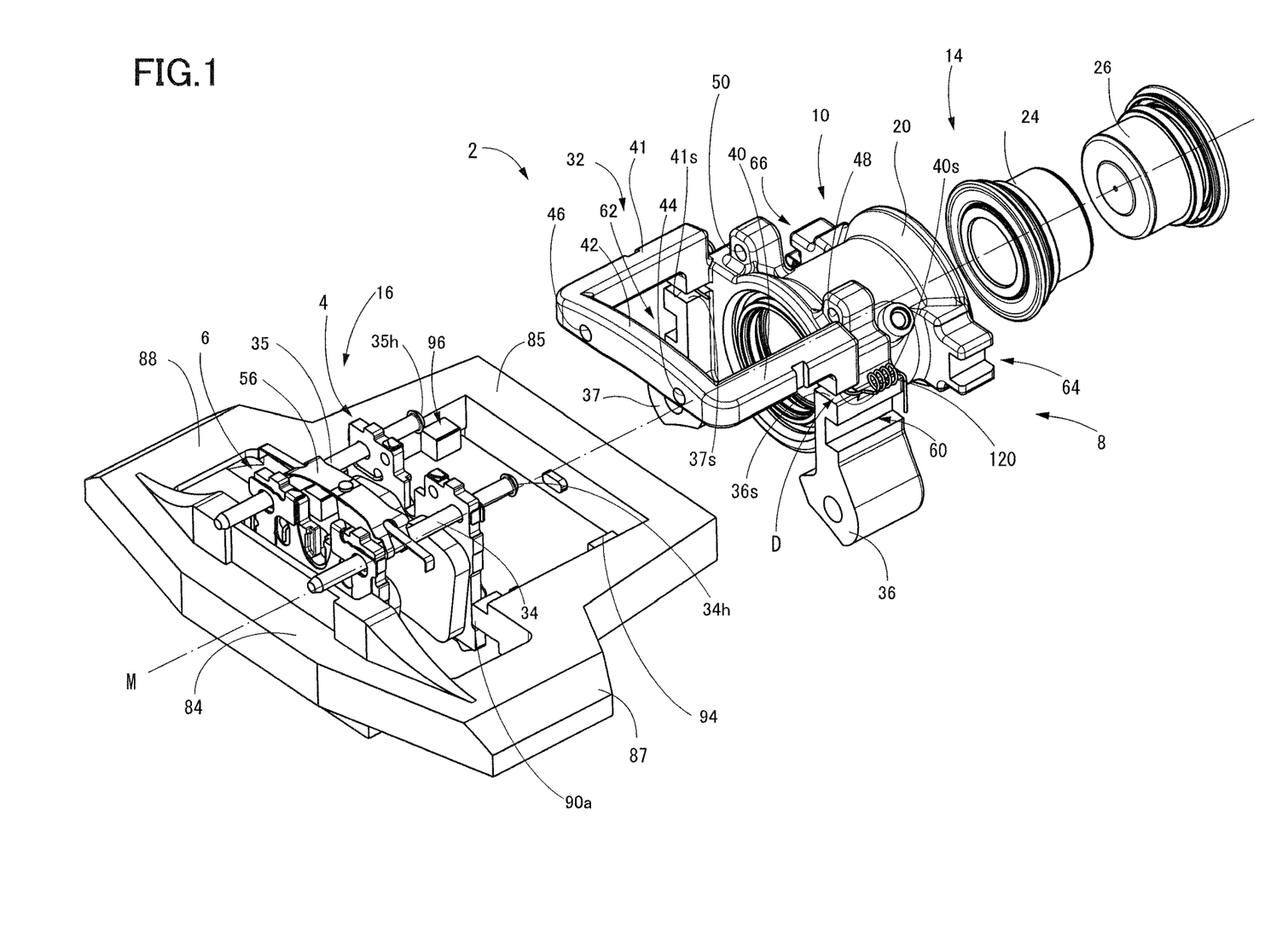
FIG. 1 is an exploded perspective view of a main portion of a disc brake according to a first embodiment.
Figure 2:
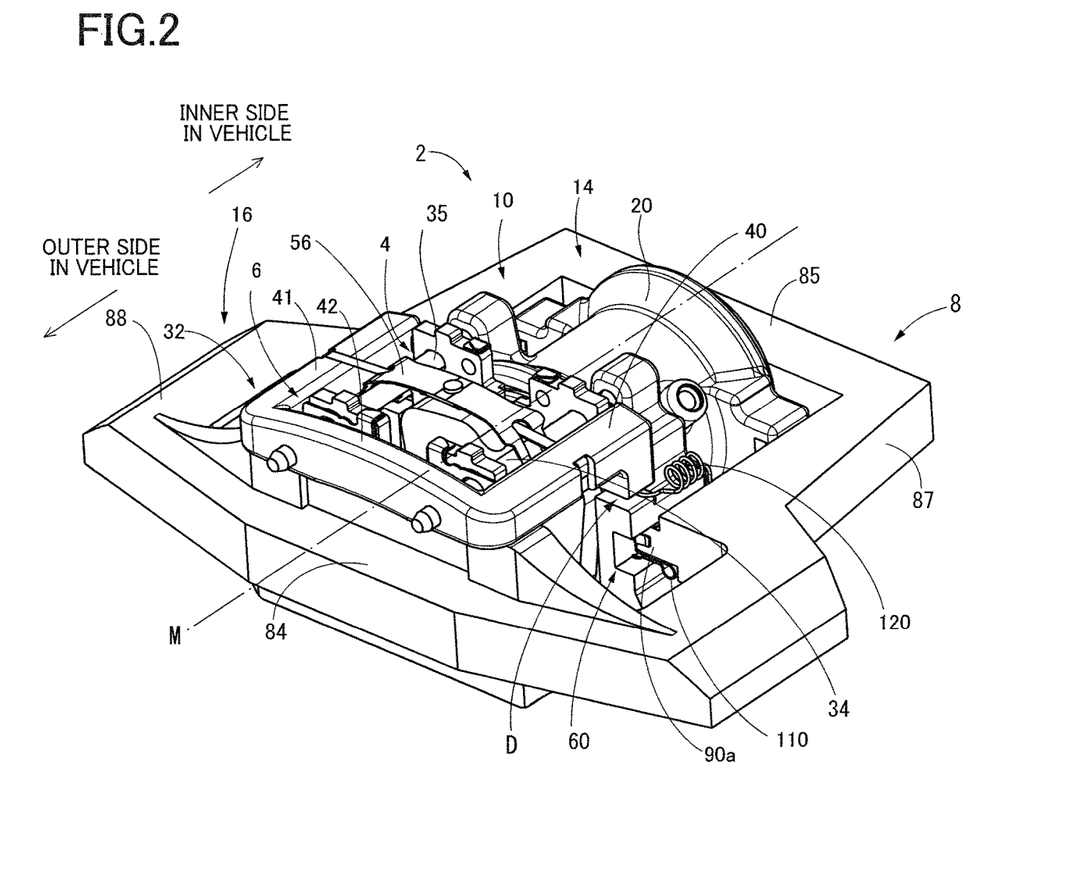
FIG. 2 is a perspective view of the disc brake.
Figure 3:
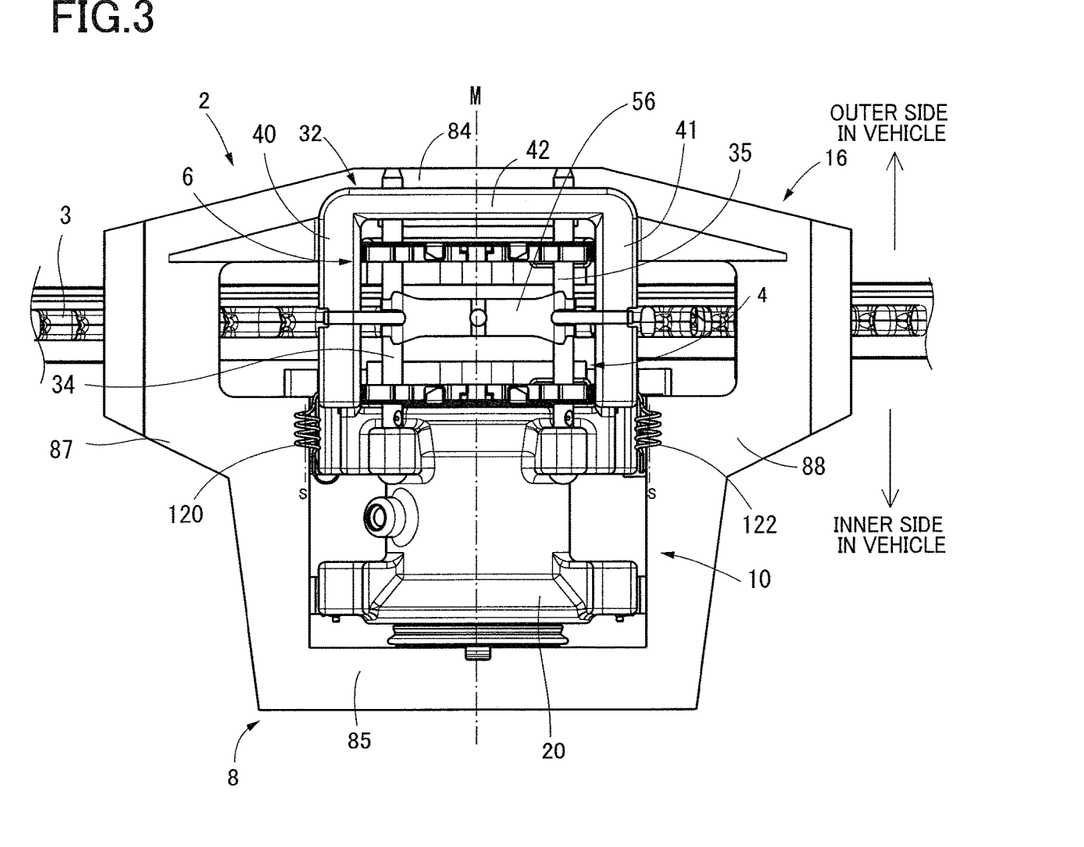
FIG. 3 is a plan view of the disc brake.
Figure 5:
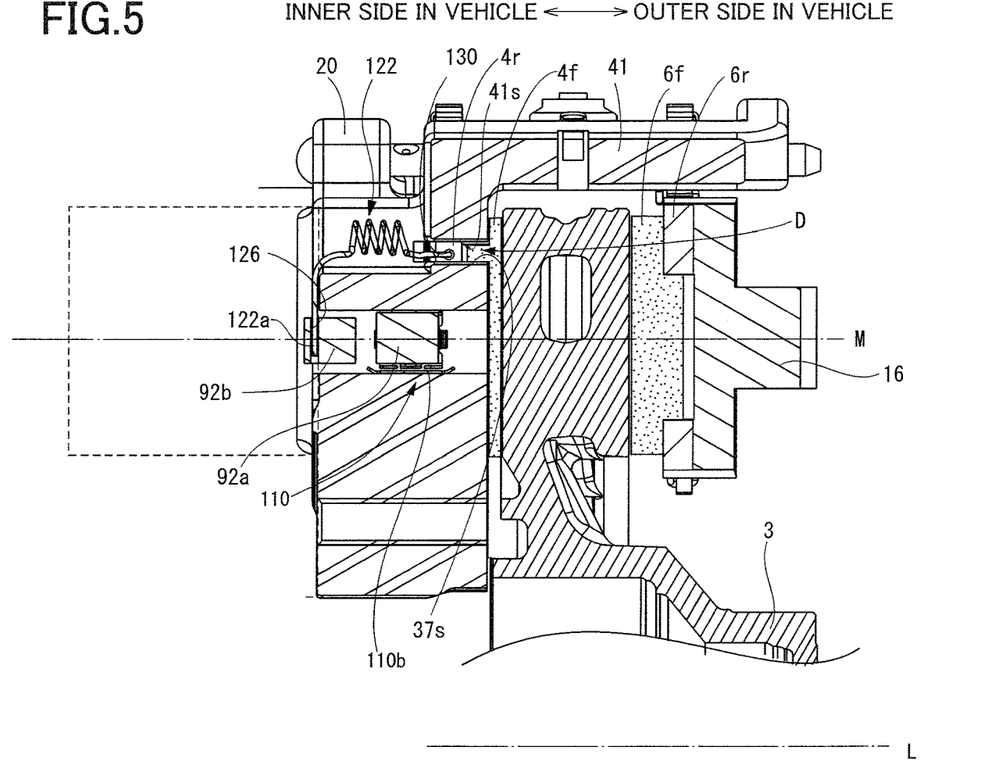
FIG. 5 is a cross-sectional view of a main portion of the disc brake.

A disc brake 2 according to the present embodiment is a floating disc brake operable by a hydraulic pressure. As illustrated in FIGS. 1-3, the disc brake 2 includes: an inner pad 4 and an outer pad 6 located on opposite sides of the rotor 3 that is rotated together with the wheel; a pressing device 8; and a housing 10 holding the pressing device 8. The pressing device 8 includes a wheel cylinder 14 and a frame 16. It is noted that, as illustrated in FIG. 5, the rotation axis L of the rotor 3 and the axis M of the pressing device 8 are parallel with each other. Thus, each of the direction parallel with the rotation axis L of the rotor 3 and the direction parallel with the axis M of the pressing device 8 may be hereinafter referred to simply as "axial direction". As illustrated in FIGS. 2 and 3, a side on which the outer pad 6 is located in the axial direction is an outer side in the vehicle, and a side on which the inner pad 4 is located in the axial direction is an inner side in the vehicle. The outer side in the vehicle and the inner side in the vehicle may be hereinafter referred to simply as "outer side" and "inner side", respectively.

Figure 4:
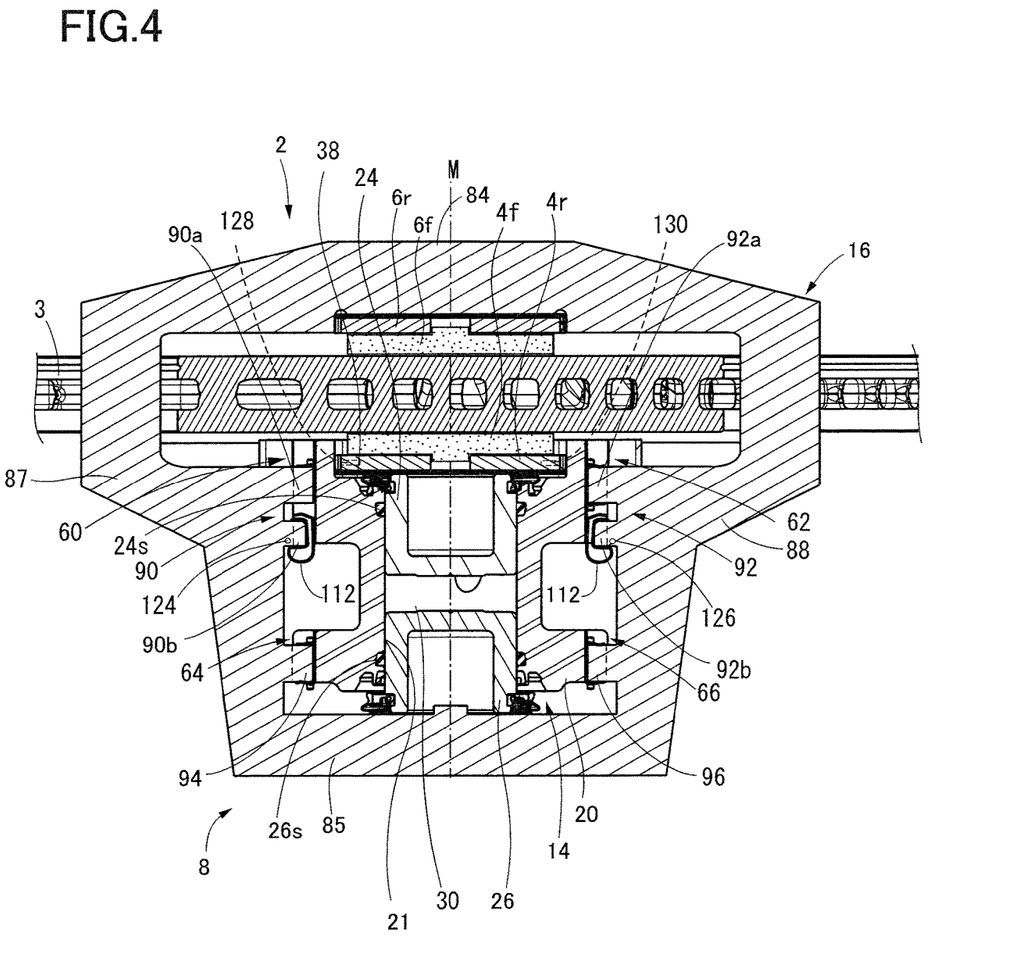
FIG. 4 is a cross-sectional view of the disc brake.

As illustrated in FIGS. 4 and 5, the inner pad 4 includes a friction engageable member 4f and a back board 4r holding the friction engageable member 4f, and the inner pad 6 includes a friction engageable member 6f and a back board 6r holding the friction engageable member 6f.

The housing 10 includes: a main housing portion 20 located on an inner side of the rotor 3 as illustrated in FIG. 4; a bridge portion 32 extending from the main housing portion 20 toward the outer side over the rotor 3 as illustrated in FIG. 3; and a pair of pad pins 34, 35 spaced apart from each other in the circumferential direction of the rotor 3 as illustrated in FIG. 3. The main housing portion 20 extends substantially in the axial direction. A cylinder bore 21 is formed through the main housing portion 20 in the axial direction. A first piston 24 as one example of a first pressing member and a second piston 26 as one example of a second pressing member are fluid-tightly and slidably fitted in the cylinder bore 21 respectively via piston seals 24s, 26s. A hydraulic-pressure chamber 30 is formed in the cylinder bore 21 at a position between the first piston 24 and the second piston 26. Each of the first piston 24 and the second piston 26 has a hollow cylindrical shape having a closed bottom. The first piston 24 and the second piston 26 are concentrically arranged in line in the axial direction in a state in which bottom portions of the first piston 24 and the second piston 26 are opposed to the hydraulic-pressure chamber 30. In the present embodiment, the main housing portion 20 or a portion of the main housing portion 20 at which the cylinder bore 21 is formed serves as a cylinder body of the wheel cylinder 14, and the wheel cylinder 14 is constituted by the cylinder body, the first piston 24, the second piston 26, and so on. Thus, it is possible to consider that the wheel cylinder 14 is held by the housing 10.

A pair of mount portions 36, 37 are provided on opposite sides, in a direction orthogonal to the axis M, of a rotor-side end portion of the main housing portion 20 in the axial direction. Each of the mount portions 36, 37 extends toward the inner side of the rotor 3 in the radial direction and is secured to a corresponding one of suspension members (which may be also referred to as "vehicle-body-side component") such as a knuckle as one example of a non-rotating member. It is noted that a stopper face 38 is provided at a portion of the main housing portion 20 which is located nearer to the rotor 3, i.e., a portion of the cylinder bore 21 near an opening. The stopper face 38 serves as a stopper that defines an initial position of the inner pad 4. The initial position is a position when the disc brake 2 is in a non-operating state.

The bridge portion 32 has a three-sided rectangular shape in plan view. The bridge portion 32 includes: a pair of rods 40, 41 spaced apart from each other in the circumferential direction and each extending in the axial direction; and a coupler 42 coupling the rods 40, 41 to each other. The coupler 42 has two through holes 44, 46 spaced apart from each other in the circumferential direction. Through holes 48, 50 are respectively formed in portions of the main housing portion 20 which correspond to the respective through holes 44, 46. The pad pin 34 is fit in the through holes 44, 48, and the pad pin 35 is fit in the through holes 46, 50 in a state in which the pad pins 34, 35 extend in the axial direction. The pad pin 34 extends through the through hole 48, the inner pad 4, the outer pad 6, and the through hole 44 in this order, and the pad pin 35 extends through the through hole 50, the inner pad 4, the outer pad 6, and the through hole 46 in a state in which heads 34h, 35h of the respective pad pins 34, 35 are located on the inner side of the other ends of the respective pad pins 34, 35. It is noted that split pins, not illustrated, are attached to outer-side end portions of the respective pad pins 34, 35 to prevent removal of the respective pad pins 34, 35.

The inner pad 4 and the outer pad 6 are thus held by the pad pins 34, 35 so as to be movable in the axial direction. Since the two pad pins 34, 35 are spaced apart from each other in the circumferential direction, pivotal movement of the inner pad 4 and the outer pad 6 about each of the pad pins 34, 35 is prevented. A leaf spring in the form of a pad spring 56 is attached to intermediate portions of the respective pad pins 34, 35. The pad spring 56 applies an elastic force to the pad pins 34, 35 in directions in which the pad pins 34, 35 are moved toward each other. This pad spring 56 reduces looseness of the inner pad 4 and the outer pad 6, resulting in reduced vibrations and abnormal sounds.

It is noted that, as illustrated in FIGS. 1, 2, and 5, the bridge portion 32 is provided in a state in which its radially-inner end faces 40s, 41s in the radial direction are spaced apart from radially-outer end faces 36s, 37s of rotor-side portions of the respective mount portions 36, 37 of the main housing portion 20. That is, a space D is formed between each of the end faces 40s, 41s and a corresponding one of the end faces 36s, 37s. Because of these spaces D, portions of side surfaces of the back board 4r of the inner pad 4 which correspond to the respective spaces D face the outside of the main housing portion 20.

Two pairs of engageable recessed portions engageable with the frame 16 are provided on the main housing portion 20 so as to be spaced apart from each other in the axial direction. As illustrated in FIGS. 1, 2, and 4, the two pairs of engageable recessed portions include a pair of first engageable recessed portions 60, 62 and a pair of second engageable recessed portions 64, 66. The first engageable recessed portions 60, 62 are provided at base portions of the respective mount portions 36, 37 provided on the rotor-side end portion of the main housing portion 20. The second engageable recessed portions 64, 66 are provided at an end portion of the main housing portion 20 which is far from the rotor 3. The first engageable recessed portions 60, 62 are spaced apart from each other in the circumferential direction. The second engageable recessed portions 64, 66 are spaced apart from each other in the circumferential direction. In the present embodiment, the first engageable recessed portion 60 and the first engageable recessed portion 62 are symmetric with respect to the axis M, and the second engageable recessed portion 64 and the second engageable recessed portion 66 are symmetric with respect to the axis M. That is, the first and second engageable recessed portions 60, 64 and the first and second engageable recessed portions 62, 66 are symmetric in shape with respect to the axis M and are provided on the main housing portion 20 respectively at positions that are symmetric with respect to the axis M. Each of the first engageable recessed portions 60, 62 and the second engageable recessed portions 64, 66 may be a grooved portion extending in the axial direction and recessed in the circumferential direction.

The frame 16 is a rigid member having a substantially frame shape and held by the main housing portion 20 so as to be movable relative to each other in the axial direction. The frame 16 includes: a first side portion 84 and a second side portion 85 extending in the direction orthogonal to the axis M and spaced apart from each other in the axial direction; and a third side portion 87 and a fourth side portion 88 extending in the direction intersecting the first side portion 84 and the second side portion 85 and spaced apart from each other in the circumferential direction. The third side portion 87 and the fourth side portion 88 couple the first side portion 84 and the second side portion 85 to each other. The first side portion 84 and the second side portion 85 are located on opposite sides of the rotor 3 in the axial direction. The first side portion 84 is located on an outer side of the rotor 3 and engaged with the outer pad 6 so as to be movable together with the outer pad 6 in the axial direction. The second side portion 85 is located on an inner side of the rotor 3 and opposed to the second piston 26.

Each of the third side portion 87 and the fourth side portion 88 extends toward the outer and inner sides of the rotor 3. Specifically, as illustrated in FIGS. 3 and 4, each of the third side portion 87 and the fourth side portion 88 extends over the rotor 3 without extending over the outer side of the inner pad 4 and the outer pad 6 in the radial direction.

Two pairs of engageable protrusions are provided on inner surfaces of the third side portion 87 and the fourth side portion 88 which face each other. The two pairs of engageable protrusions are spaced apart from each other in the axial direction. The two pairs of engageable protrusions include a pair of first engageable protrusions 90, 92 and a pair of second engageable protrusions 94, 96 that are farther from the rotor 3 than the pair of first engageable protrusions 90, 92. Each of the first engageable protrusions 90, 92 includes two protrusions spaced apart from each other in the axial direction. That is, the first engageable protrusions 90 include protrusions 90a, 90b, and the first engageable protrusions 92 include protrusions 92a, 92b. Each of the first engageable protrusions 90 (90a, 90b), 92 (92a, 92b) and the second engageable protrusions 94, 96 protrudes in the circumferential direction. The protrusion 90a, 92a are located nearer to the rotor 3 than the respective the protrusions 90b, 92b. In the present embodiment, the first engageable protrusions 90 and the second engageable protrusion 94, and the first engageable protrusions 92 and the second engageable protrusion 96 are symmetric with respect to the axis M. That is, the first engageable protrusions 90 and the second engageable protrusion 94, and the first engageable protrusions 92 and the second engageable protrusion 96 are symmetric in shape with respect to the axis M and are provided on the third side portion 87 and the fourth side portion 88 of the frame 16 at positions that are symmetric with respect to the axis M.

Figure 8:
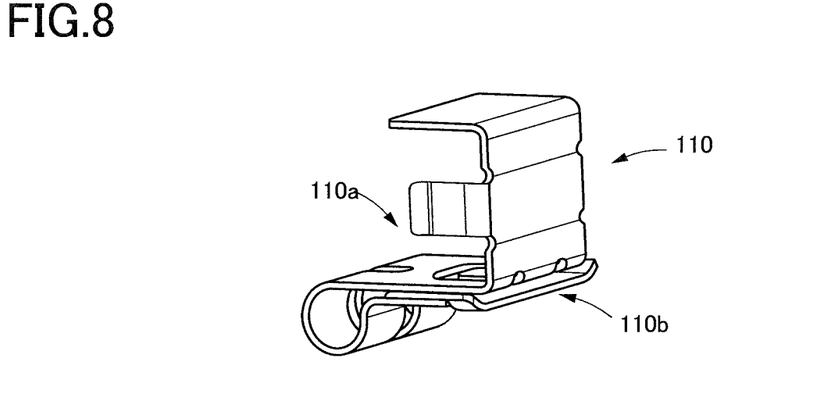
FIG. 8 is a perspective view of a radial spring mounted on an engageable protrusion of a frame of the disc brake.
Figure 9:
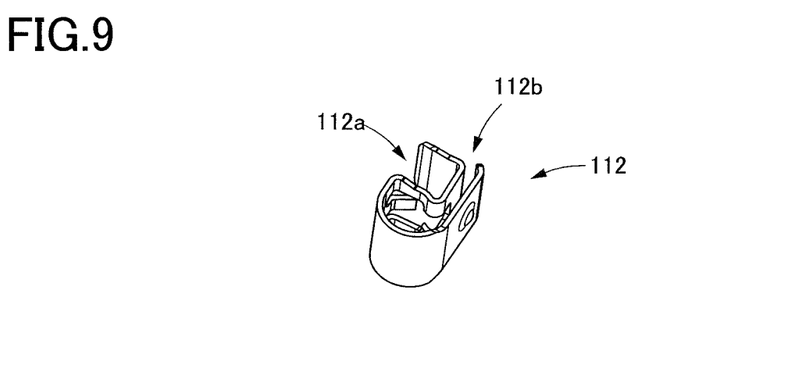
FIG. 9 is a perspective view of a circumferential spring mounted on a protrusion different from the above-described engageable protrusion.

Radial springs 110 illustrated in FIG. 8 are mounted respectively on the protrusions 90a, 92a of the respective first engageable protrusions 90, 92 and the second engageable protrusions 94, 96. Circumferential springs 112 illustrated in FIG. 9 are mounted respectively on the protrusions 90b, 92b of the respective first engageable protrusions 90, 92.

Each of the radial springs 110 includes: a fitting portion 110a formed by bending a plate member in a substantially three-sided rectangular shape; and a spring portion 110b overlapping a side surface of the fitting portion 110a with a space therebetween. The radial springs 110 are attached respectively to the protrusions 90a, 92a and the second engageable protrusions 94, 96 (hereinafter may be referred to as "the protrusion 90a and so on") in a state in which each of the protrusion 90a and so on is fitted in a corresponding one of the fitting portions 110a in the radial direction, and a corresponding one of the spring portions 110b is located on an inner side of each of the protrusion 90a and so on in the radial direction.

Each of the circumferential springs 112 includes: a fitting portion 112a formed by bending a plate member in a substantially three-sided rectangular shape; and a spring portion 112b overlapping a bottom surface of the fitting portion 112a with a space therebetween. The circumferential springs 112 are attached to the respective protrusions 90b, 92b in a state in which each of the protrusions 90b, 92b is fitted in a corresponding one of the fitting portions 112a in the axial direction, and a corresponding one of the spring portions 112b is located on an inner side of each of the protrusions 90b, 92b in the circumferential direction.

The first engageable protrusions 90, 92 formed on the frame 16 are engaged with the respective first engageable recessed portions 60, 62 formed on the main housing portion 20. The second engageable protrusions 94, 96 are engaged with the respective second engageable recessed portions 64, 66. As illustrated in FIGS. 2, 4, and 5, the protrusion 90a, 92a of the respective first engageable protrusions 90, 92, and the second engageable protrusions 94, 96 are engaged respectively with the first engageable recessed portions 60, 62 and the second engageable recessed portions 64, 66 via the radial springs 110. Each of the spring portions 110b of the respective radial springs 110 is located between a corresponding one of radially-inner surfaces of the first engageable protrusions 90a, 92a and the second engageable protrusions 94, 96 and a corresponding one of radially-inner surfaces of the first engageable recessed portions 60, 62 and the second engageable recessed portions 64, 66. While the protrusions 90b, 92b of the respective first engageable protrusions 90, 92 are engaged with the respective first engageable recessed portions 60, 62 via the respective circumferential springs 112, each of the spring portions 112b of the respective circumferential springs 112 is located between a corresponding one of circumferentially-inner surfaces of the respective protrusions 90b, 92b and a corresponding one of circumferentially-inner surfaces of the respective first engageable recessed portions 60, 62. The radial springs 110 and the circumferential springs 112 reduce positional misalignment of the frame 16 relative to the main housing portion 20 in the radial direction and the circumferential direction, resulting in reduced vibrations and abnormal sounds.

It is noted that the corrosion potential of each of the radial springs 110 and the circumferential springs 112 is a middle amount between the corrosion potential of the frame 16 and the corrosion potential of the housing 10. For example, in the case where the housing 10 is formed of a material containing aluminum, and the frame 16 is formed of resin, the elastic member may be formed of a stainless material or a material containing nickel. Thus, when compared with a case where the frame 16 and the housing 10 are brought into direct sliding contact with each other, it is possible to reduce a potential difference between the sliding-contact members, resulting in reduced corrosion of the housing 10, for example.

Figure 7:
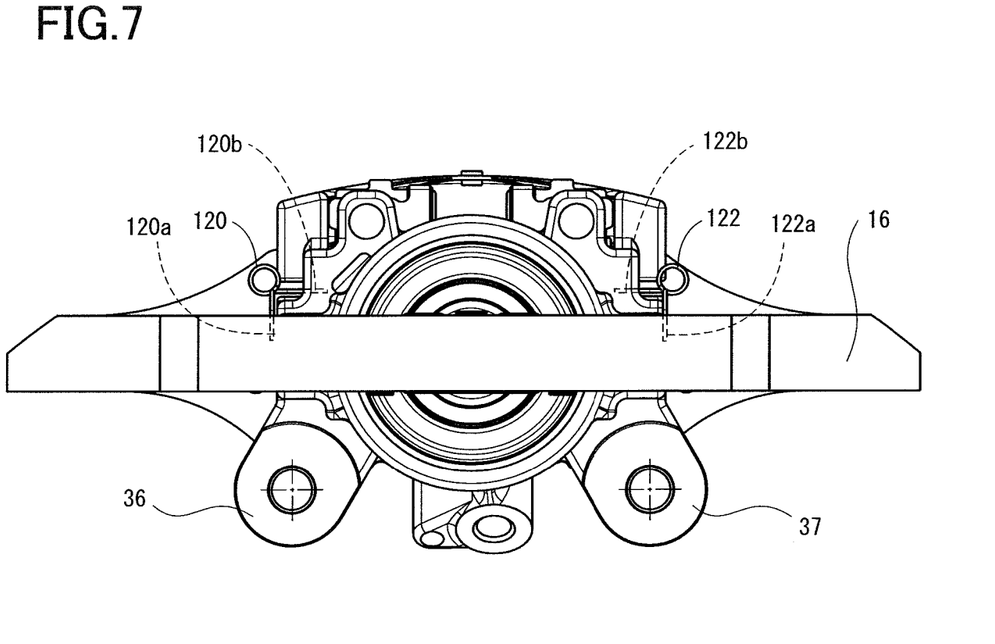
FIG. 7 is a rear view of the disc brake.
Figure 10:
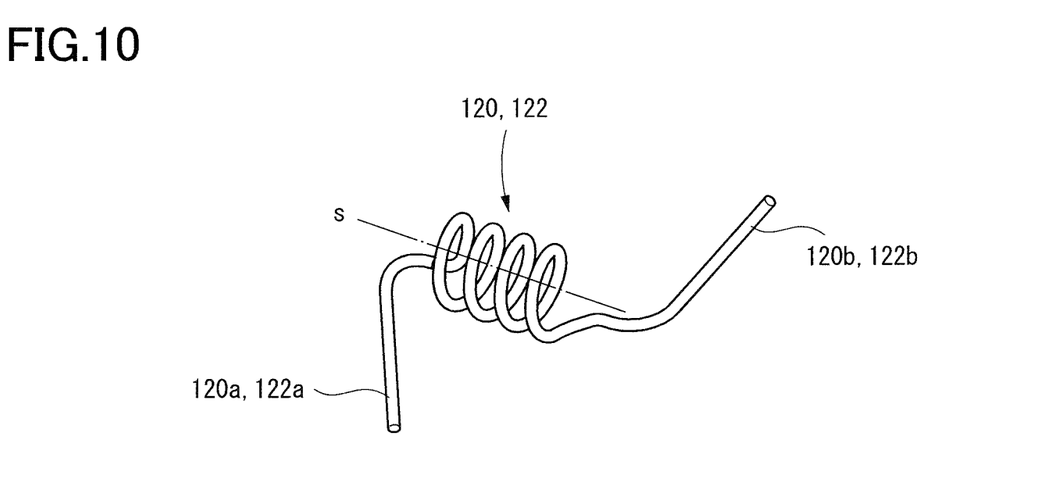
FIG. 10 is a perspective view of a return spring of the disc brake.

As illustrated in FIG. 3, a pair of return springs 120, 122 are provided between the inner pad 4 and the frame 16 so as to be spaced apart from each other in the circumferential direction. As illustrated in FIG. 10, each of the return springs 120, 122 is a coil spring. As illustrated in FIG. 7, each of one end portions 120a, 122a of the respective return springs 120, 122 and a corresponding one of the other end portions 120b, 122b of the respective return springs 120, 122 extend respectively in directions substantially perpendicular to each other in rear view (front view).

Figure 6:
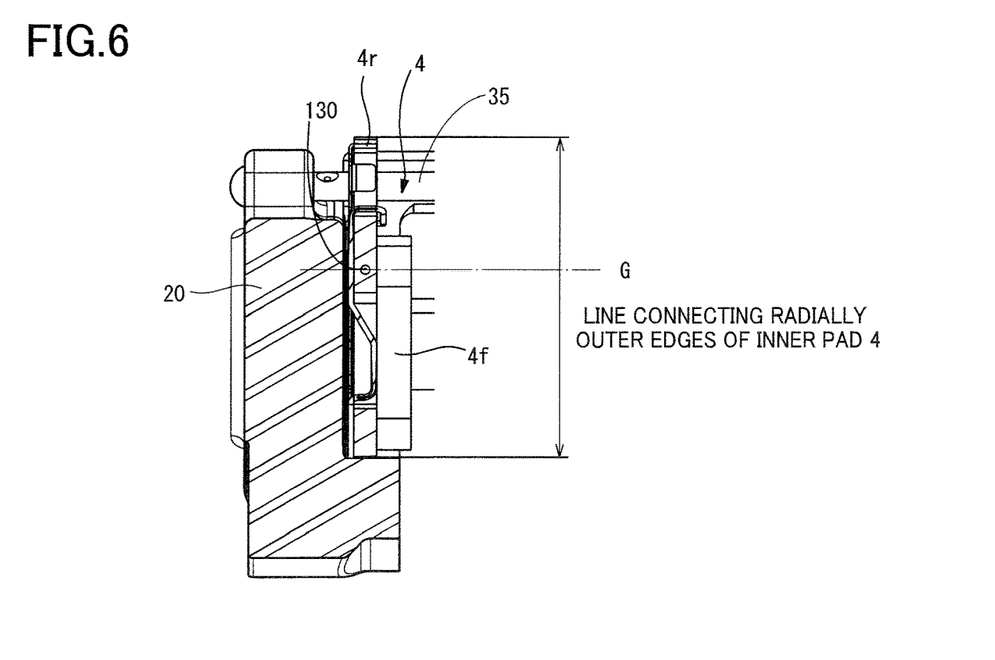
FIG. 6 is a cross-sectional view taken along a line different from that in FIG. 5.

As illustrated in FIG. 5, frame-side holes 124, 126 are formed in base portions (respectively located near the third side portion 87 and the fourth side portion 88) of the respective protrusions 90b, 92b of the frame 16 at respective positions spaced apart from the rotor 3. Each of the frame-side holes 124, 126 is a through hole extending substantially in the radial direction. Since the circumferential springs 112 are mounted on the respective protrusions 90b, 92b, no springs are provided on radially-outer surfaces of the respective protrusions 90b, 92b. Pad-side holes 128, 130 are formed in the respective portions of the side surfaces of the back board 4r of the inner pad 4 which correspond to the respective spaces D. Each of the pad-side holes 128, 130 is a hole extending substantially in the circumferential direction. As illustrated in FIG. 6, the pad-side holes 128, 130 are located at the same position as the center of gravity G of the inner pad 4 in the radial direction. That is, a line connecting between the pad-side holes 128, 130 extends through the center of gravity G of the inner pad 4.

The one end portions 120a, 122a of the respective return springs 120, 122 are inserted into the respective frame-side holes 124, 126 and thereby mounted on the frame 16. The other end portions 120b, 122b are inserted into the respective pad-side holes 128, 130 via the respective spaces D and thereby mounted on the inner pad 4. As a result, the return springs 120, 122 are provided in a state in an orientation in which, as illustrated in FIG. 3, the axis s of each of the return springs 120, 122 is located between the frame 16 and the inner pad 4 and extends parallel with the axis M of the pressing device 8, in other words, in an orientation in which the resilient force of each of the return springs 120, 122 acts in a direction parallel with the axis M.

Figure 11:
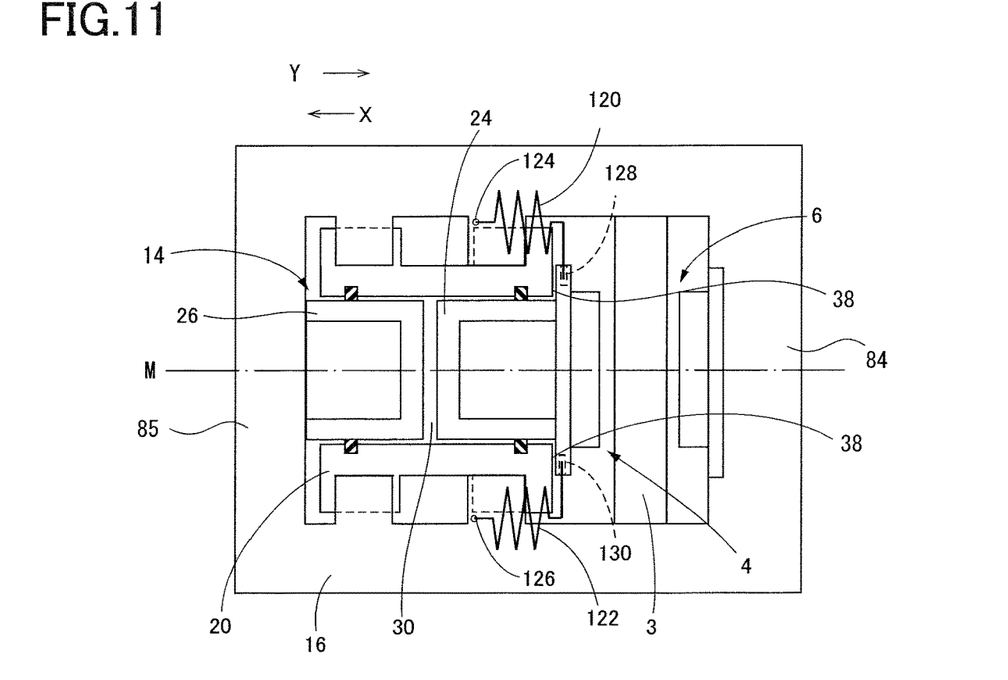
FIG. 11 is a view schematically illustrating a non-operating state of the disc brake.

The disc brake 2 configured as described above is in a state illustrated in FIG. 11 when the disc brake 2 is in the non-operating state (an initial state). The first piston 24, the second piston 26, and the frame 16 are located at their respective initial positions, and the inner pad 4 and the outer pad 6 are spaced apart from the rotor 3. Positions of the inner pad 4 and the frame 16 relative to each other are initial-situation relative positions that are predetermined relative positions.

Figure 12:
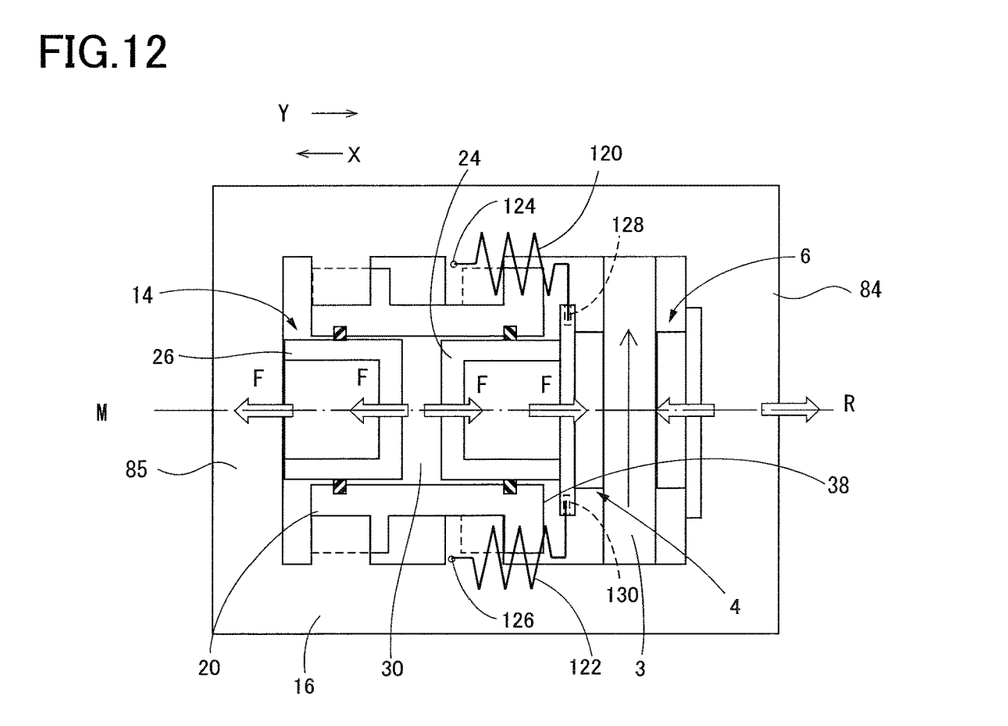
FIG. 12 is a view schematically illustrating an operating state of the disc brake.

When a hydraulic pressure is supplied to the hydraulic-pressure chamber 30, the disc brake 2 is actuated. As illustrated in FIG. 12, a force F related to the hydraulic pressure in the hydraulic-pressure chamber 30 of the wheel cylinder 14 is applied to the first piston 24 and the second piston 26. The first piston 24 is moved toward the rotor 3 in the direction indicated by the arrow Y in the axial direction to press the inner pad 4 against the rotor 3. The second piston 26 is moved in the direction indicated by the arrow X (away from the rotor 3) in the axial direction, and the frame 16 is moved in the direction indicated by the arrow X in the axial direction to press the outer pad 6 against the rotor 3. The rotor 3 is pressed by the inner pad 4 and the outer pad 6 from opposite sides of the rotor 3, whereby the rotor 3 and each of the inner pad 4 and the outer pad 6 are brought into frictional engagement with each other. As a result, the disc brake 2 is operated to reduce rotation of the wheel. Thus, since the frame 16 is moved in the direction indicated by the arrow X, and the inner pad 4 is moved in the direction indicated by the arrow Y during operation of the disc brake 2, the return springs 120, 122 are stretched.

Figure 13:
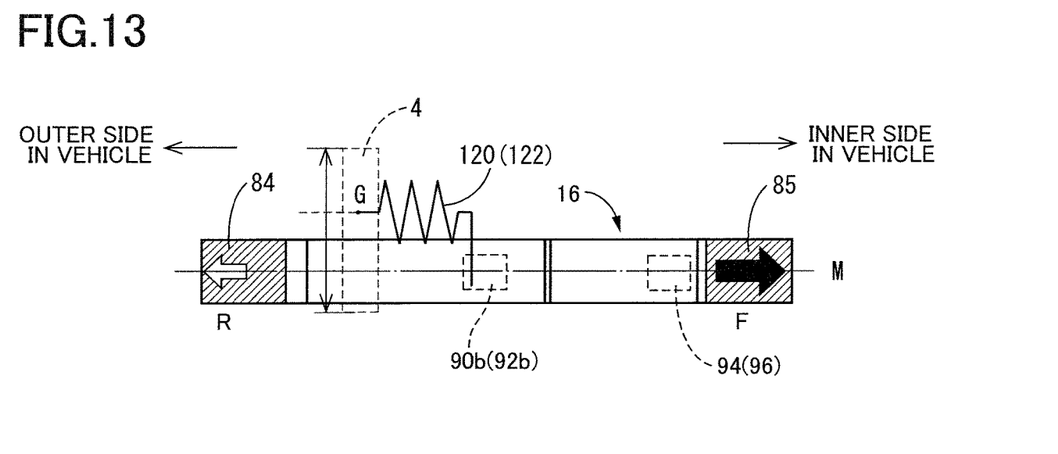
FIG. 13 is a view schematically illustrating the frame in the operating state of the disc brake.

The frame 16 receives a reaction force R related to the pressing force F applied from the outer pad 6 to the rotor 3. That is, the frame 16 receives the pressing force F and the reaction force R respectively directed in opposite directions. As illustrated in FIG. 13, the lines of application of the forces F, R are located on the same plane in the frame 16. This configuration reduces inclination of the frame 16 during operation of the disc brake 2, thereby reducing lowering of the pressing force due to the inclination of the frame 16.

To release the disc brake 2, the resilient forces of the piston seals 24s, 26s, the inner pad 4, and the outer pad 6 return the first piston 24 and the second piston 26 to their respective initial positions. The return springs 120, 122 apply the resilient forces to the frame 16 and the inner pad 4 so as to move the frame 16 and the inner pad 4 toward each other. The inner pad 4 is moved in the direction indicated by the arrow X, and the frame 16 is moved in the direction indicated by the arrow Y, so that the relative positions of the frame 16 and the inner pad 4 are returned to the initial-situation relative positions. Since the stopper face 38 limits movement of the inner pad 4 in the direction indicated by the arrow X, it is possible to return the frame 16 to the initial position well. This makes it possible to separate the outer pad 6 from the rotor 3 well to reduce brake drag.

If the return springs are provided between outer circumferential portions of the inner pad 4 and the outer pad 6, the inner pad 4 and the outer pad 6 are in some cases inclined by the resilient force of the return springs, causing inner circumferential portions of the inner pad 4 and the outer pad 6 to contact the rotor 3. In the present embodiment, in contrast, the other end portions 120b, 122b of the respective return springs 120, 122 are mounted at the same position as the center of gravity of the inner pad 4 in the radial direction. Thus, when releasing the disc brake 2, it is possible to return the inner pad 4 to its initial position with reduced inclination of the inner pad 4, making it difficult for the inner circumferential portion of the inner pad 4 to contact the rotor 3.

The return springs 120, 122 are mounted between the frame 16 and the inner pad 4 in an orientation in which the return springs 120, 122 are stretched and compressed in the direction parallel with the axis M. Also, the one end portions 120a, 122a are mounted on the frame 16 in a state in which the one end portions 120a, 122a intersect the plane on which the lines of application of the forces F, R extend in the frame 16, for example, the one end portions 120a, 122a are orthogonal to the plane. This configuration makes it possible to stably apply pull strength in the axial direction to the return springs 120, 122 during operation of the disc brake 2. Accordingly, when releasing the disc brake 2, the resilient forces of the return springs 120, 122 well return the frame 16 and the inner pad 4 to their initial-situation relative positions.

In the disc brake 2 according to the present embodiment, the return springs 120, 122 are provided between the frame 16 and the inner pad 4, whereby the inner pad 4 and the outer pad 6 are spaced away from the rotor 3 well. In other words, there is no need to provide the return spring over the rotor 3. This improves the flexibility in design and placement of the return spring.

Figure 14:
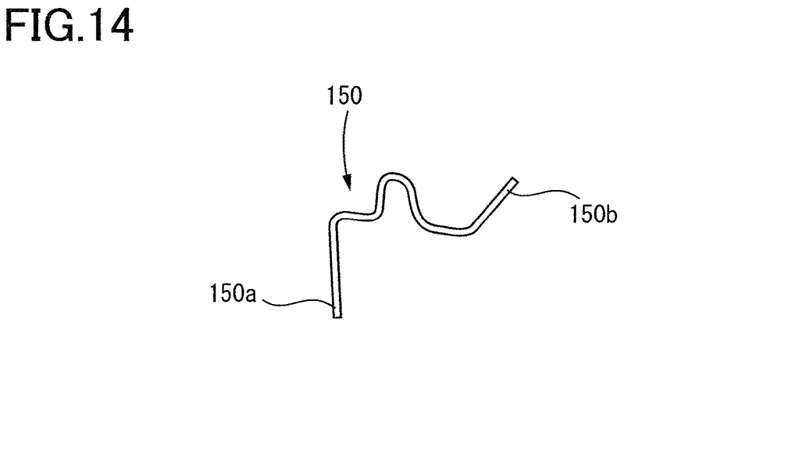
FIG. 14 is a perspective view of a return spring different from the above-described return spring.
Figure 15:
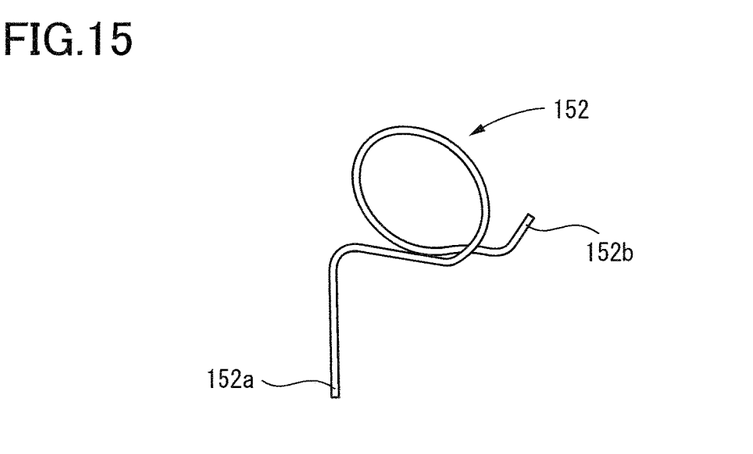
FIG. 15 is a perspective view of a return spring different from the above-described return springs.

It is noted that the return spring may have any shape. For example, return springs 150, 152 illustrated in FIGS. 14 and 15 may be provided. Each of the return springs 150, 152 is a linear member. Each of one end portions 150a, 152a of the respective return springs 150, 152 and a corresponding one of the other end portions 150b, 152b of the respective return springs 150, 152 extend respectively in directions substantially perpendicular to each other in front view (rear view). The return spring 150 has one curved portion, and the return spring 152 has one loop portion. Thus, the return springs 150, 152 are less than the return springs 120, 122 in spring force, resulting in reduced consumption of the pressing force during operation of the disc brake 2.

Second Embodiment

Figure 16:
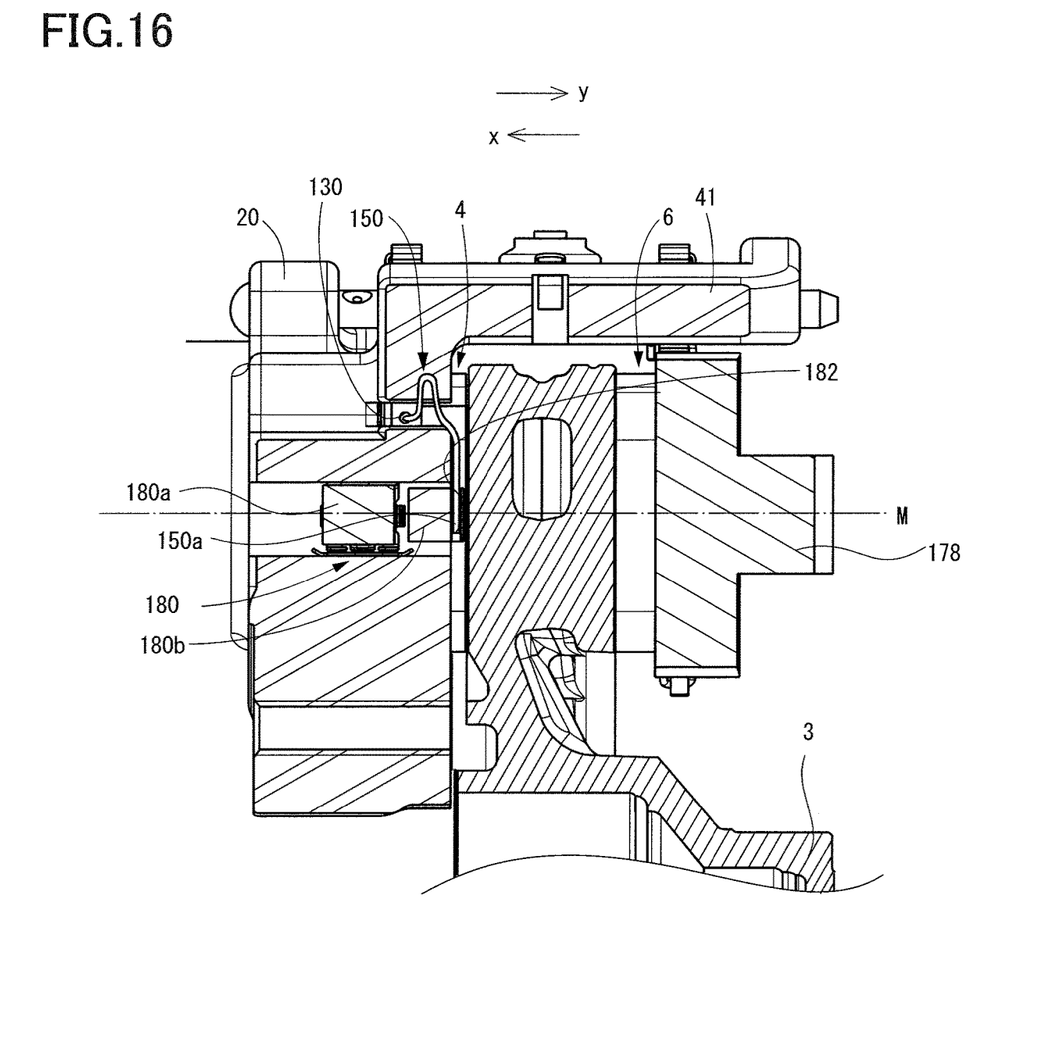
FIG. 16 is a cross-sectional view of a main portion of a disc brake according to a second embodiment.

In the second embodiment, a frame 178 includes a pair of first engageable protrusions 180 spaced apart from each other in the circumferential direction. FIG. 16 illustrates only one of the first engageable protrusions 180. As illustrated in FIG. 16, the first engageable protrusion 180 has: a protrusion 180a on which the radial spring 110 is mounted; and a protrusion 180b on which the circumferential spring 112 is mounted. The protrusion 180b is located nearer to the rotor 3 than the protrusion 180a. A frame-side hole 182 is formed in a portion of a base portion of the protrusion 180b which is located near the rotor 3. The frame-side hole 182 extends substantially in the radial direction. The one end portion 150a of the return spring 150 is inserted in the frame-side hole 182, and the other end portion 150*b* of the return spring 150 is inserted in a pad-side hole 130, whereby the return spring 150 is mounted between the frame 178 and the inner pad 4. In the present embodiment, when the disc brake is operated, the inner pad 4 is moved in the direction indicated by the arrow Y, and the frame 178 is moved in the direction indicated by the arrow X, so that the return spring 150 is compressed. That is, it is considered that, also in the case where the disc brake is operated, the one end portion 150*a* and the other end portion 150*b* are moved toward each other in a state in which the one end portion 150*a* is located nearer to the rotor 3 than the other end portion 150*b*, and thereby the return spring 150 is compressed. When the disc brake is released, the resilient force of the return spring 150 returns the inner pad 4 and the frame 178 to their respective initial positions to separate the outer pad 6 from the rotor 3.

Third Embodiment

Figure 17:
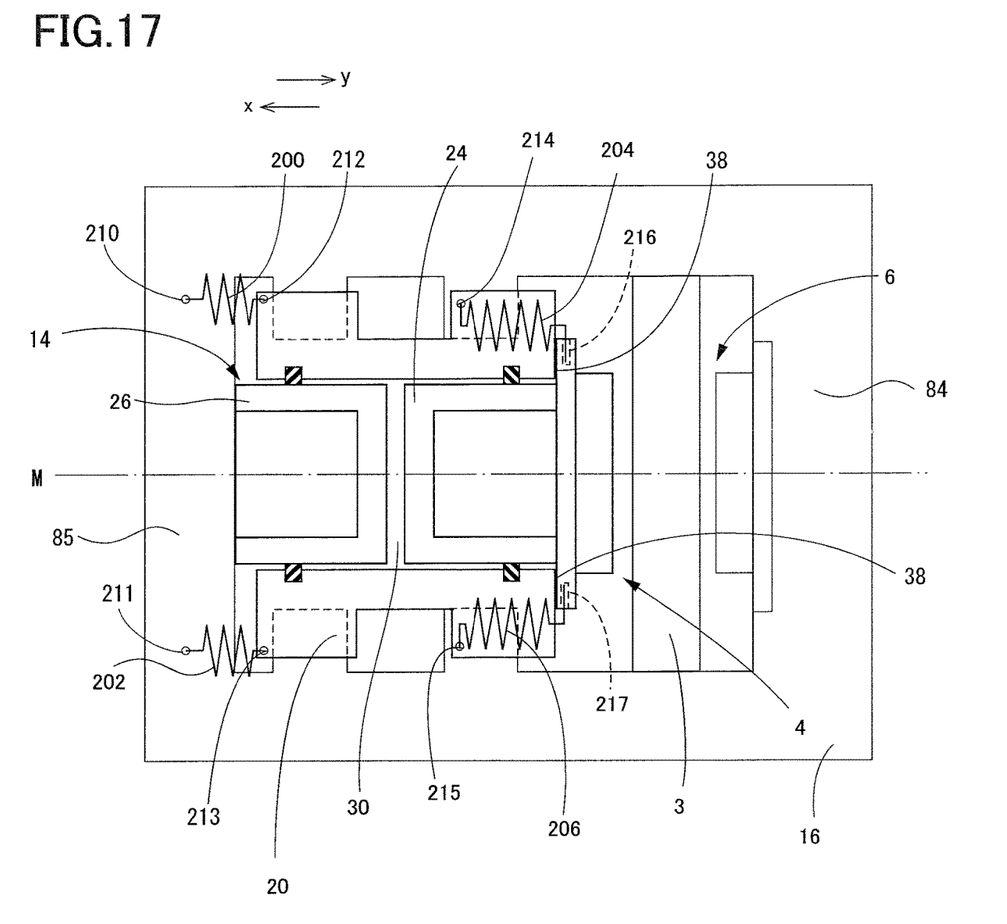
FIG. 17 is a view schematically illustrating a disc brake according to a third embodiment.

In the third embodiment, as illustrated in FIG. 17, a pair of first return springs 200, 202 spaced apart from each other in the circumferential direction are provided between the frame 16 and the main housing portion 20, and a pair of second return springs 204, 206 spaced apart from each other in the circumferential direction are provided between the main housing portion 20 and the inner pad 4. The frame 16 has frame-side holes 210, 211 each extending substantially in the radial direction. The main housing portion 20 has: first housing-side holes 212, 213 and second housing-side holes 214, 215 each extending substantially in the radial direction; and pad-side holes 216, 217 each extending substantially in the circumferential direction. One end portions of the respective first return springs 200, 202 are inserted in the respective frame-side holes 210, 211 and thereby held by the frame 16. The other end portions of the respective first return springs 200, 202 are inserted in the respective first housing-side holes 212, 213 and thereby held by the main housing portion 20. One end portions of the respective second return springs 204, 206 are inserted in the respective second housing-side holes 214, 215 and thereby held by the main housing portion 20. The other end portions of the respective second return springs 204, 206 are inserted in the respective pad-side holes 216, 217 and thereby held by the inner pad 4. Each of the first return springs 200, 202 and the second return springs 204, 206 is in an orientation in which each spring generates a resilient force in the axial direction.

When the disc brake 2 is operated, the inner pad 4 is moved in the direction indicated by the arrow Y, and the frame 16 is moved in the direction indicated by the arrow X. This stretches the first return springs 200, 202 and the second return springs 204, 206. When the disc brake 2 is released, the resilient forces of the first return springs 200, 202 and the second return springs 204, 206 return the inner pad 4 and the frame 16 to their respective initial positions, thereby reducing brake drag well.

It is noted that the second return springs 204, 206 are not essential, and only the first return springs 200, 202 may be provided. The disc brake 2 is not limited to the hydraulic disc brake and may be an electromagnetic disc brake operable by an electromagnetic driving force. While the embodiments and modifications have been described above, it is to be understood that the disclosure is not limited to the details of the illustrated embodiments and modifications, but may be embodied with various changes and modifications, which may occur to those skilled in the art, without departing from the spirit and scope of the disclosure.

Claimable Inventions (1) A disc brake of a floating type, comprising:
 an inner pad and an outer pad respectively located on opposite sides of a rotor rotatable with a wheel;
 a pressing device configured to press the inner pad and the outer pad against the rotor; and
 a housing mounted on a non-rotating member and holding the pressing device, the inner pad, and the outer pad,
  wherein the pressing device comprises:
  a first pressing member movable toward the rotor;
  a second pressing member movable away from the rotor; and
  a frame having a substantially frame shape and comprising (i) a first side portion opposed to the second pressing member and (ii) a second side portion engaged with the outer pad and movable together with the outer pad in a direction parallel with a rotation axis of the rotor, and
 wherein the disc brake comprises a return spring provided between the frame and one of the housing and the inner pad.

(2) The disc brake according to the above form (1), wherein one end portion of the return spring is mounted on the frame, and another end portion of the return spring is mounted on one of the housing and the inner pad.

The one end portion of the return spring is mounted on the frame, and the other end portion is mounted on one of the housing and the inner pad. Thus, when compared with the case where an end portion of the elastic portion is in contact with the inner pad and the outer pad as described in Patent Document 2, it is possible to stably apply the resilient force of the return spring to the frame and one of the housing and the inner pad.

(3) The disc brake according to the above form (2),
 wherein the frame is held by the housing via an engageable portion so as to be movable relative to the housing in the direction parallel with the rotation axis of the rotor,
 wherein the engageable portion comprises: an engageable recessed portion formed in the housing; and an engageable protrusion formed on the frame, and
 wherein the one end portion of the return spring is mounted on the engageable protrusion formed on the frame.

The one end portion of the return spring is preferably mounted at a portion of the engageable protrusion which is not opposed to the engageable recessed portion, for example, at a base portion of the engageable protrusion. The one end portion of the return spring is preferably mounted at a portion of the engageable protrusion which is far from the rotor. This is because the frame is moved away from the rotor by operation of the disc brake. In the above-described embodiment, the engageable portion is constituted by the protrusions 90*b*, 92*b* of the respective first engageable protrusions 90, 92 and the first engageable recessed portions 60, 62, for example.

(4) The disc brake according to the above form (2) or (3), wherein the one end portion of the return spring is mounted on the frame in a state in which the one end portion of the return spring intersects a plane containing a line of application of a force acting on the frame during operation of the disc brake.

A force in a direction parallel with the rotation axis of the rotor is applied to the frame during operation of the disc brake. The one end portion of the return spring is mounted on the frame in a state in which the one end portion of the return spring intersects the plane containing a line of application of the force applied to the frame. Thus, the force in the direction parallel with the rotation axis of the rotor is stably applied to the one end portion of the return spring during operation of the disc brake. Accordingly, when releasing the disc brake, the resilient force of the return spring well returns the frame to its initial position. It is noted that the one end portion of the return spring is preferably mounted on the frame in a state in which the one end portion of the return spring is orthogonal to the plane containing the line of application of the force applied to the frame.

(5) The disc brake according to any one of the above forms (2) through (4), wherein the one end portion of the return spring is mounted on the frame by being inserted in a frame-side hole formed in the frame and extending substantially in a radial direction of the rotor.

The frame-side hole is preferably formed so as to extend in a direction orthogonal to the axial direction, in other words, in a direction orthogonal to the line of application of the force applied to the frame.

(6) The disc brake according to any one of the above forms (2) through (5),
wherein the return spring is provided between the frame and the inner pad, and
wherein said another end portion of the return spring is mounted on the inner pad at a position that is identical in position to a center of gravity of the inner pad in a radial direction of the rotor.

Said another end portion of the return spring may be mounted on a back board holding a friction engageable member of the inner pad. The center of gravity of the inner pad is the center of gravity of an element containing the friction engageable member and the back board.

(7) The disc brake according to any one of the above forms (2) through (6),
wherein the inner pad comprises:
a friction engageable member comprising a friction engageable surface frictionally engageable with the rotor; and
a back board holding the friction engageable member,
wherein the back board comprises a pad-side hole extending substantially in a direction orthogonal to the radial direction of the rotor, and
wherein said another end portion of the return spring is inserted in the pad-side hole and held by the inner pad.

(8) The disc brake according to any one of the above forms (1) through (7), wherein the return spring is a coil spring provided between the frame and the inner pad and configured to generate a resilient force in the direction parallel with the rotation axis of the rotor.

The return spring is provided between the frame and the inner pad in an orientation in which the axis of the coil spring extends parallel with the rotation axis of the rotor.

(9) The disc brake according to any one of the above forms (1) through (8),
wherein the return spring is provided between the frame and the inner pad, and
wherein the housing comprises a stopper configured to define an initial position of at least one of the frame and the inner pad.

Thus, also in the case where the return spring is provided between a pair of movable members (the frame and the inner pad), relative positions of the frame and the inner pad are returned to initial-situation relative positions by the resilient force of the return spring.

(10) The disc brake according to any one of the above forms (1) through (9),
wherein the return spring is provided between the frame and the inner pad, and
wherein one end portion and another end portion of the return spring extend respectively in directions substantially perpendicular to each other in front view.

(11) The disc brake according to the above form (10),
wherein the frame comprises a frame-side hole extending substantially in a radial direction of the rotor,
wherein the inner pad comprises:
a friction engageable member comprising a friction engageable surface frictionally engageable with the rotor; and
a back board holding the friction engageable member,
wherein the back board comprises a pad-side hole extending substantially in a direction orthogonal to the radial direction of the rotor,
wherein the one end portion of the return spring is inserted in the frame-side hole and held by the frame, and
wherein said another end portion of the return spring is inserted in the pad-side hole and held by the inner pad.

(12) The disc brake according to any one of the above forms (1) through (11),
wherein the return spring is a first return spring provided between the frame and the housing, and
wherein the disc brake further comprises a second return spring that is a return spring different from the first return spring and provided between the housing and the inner pad.

The return springs are provided between the housing and the frame and between the housing and the inner pad, making it possible to return the frame and the inner pad to their initial positions well.

What is claimed is:

1. A disc brake of a floating type, comprising:
an inner pad and an outer pad respectively located on opposite sides of a rotor rotatable with a wheel;
a pressing device configured to press the inner pad and the outer pad against the rotor, and
a housing mounted on a non-rotating member and holding the pressing device,
wherein the pressing device comprises:
a first pressing member movable toward the rotor;
a second pressing member movable away from the rotor; and
a frame comprising (i) a first side portion opposed to the second pressing member and (ii) a second side portion engaged with the outer pad and movable together with the outer pad in a direction parallel with a rotation axis of the rotor, and
wherein the disc brake comprises a return spring provided between the frame and the inner pad,
wherein one end portion and another end portion of the return spring extend respectively in directions substantially perpendicular to each other in front view,
wherein the frame comprises a frame-side hole extending substantially in a radial direction of the rotor,
wherein the inner pad comprises:
a friction engageable member comprising a friction engageable surface frictionally engageable with the rotor; and
a back board holding the friction engageable member,
wherein the back board comprises a pad-side hole extending substantially in a direction orthogonal to the radial direction of the rotor,
wherein the one end portion of the return spring is inserted in the frame-side hole and held by the frame, and
wherein said another end portion of the return spring is inserted in the pad-side hole and held by the inner pad.

2. The disc brake according to claim 1,
wherein the frame is held by the housing via an engageable portion so as to be movable relative to the housing in the direction parallel with the rotation axis of the rotor, wherein the engageable portion comprises: an engageable recessed portion formed in the housing; and an engageable protrusion formed on the frame, and wherein the one end portion of the return spring is mounted on the engageable protrusion formed on the frame.

3. The disc brake according to claim 1, wherein the housing comprises a stopper configured to define an initial position of at least one of the frame and the inner pad.

4. The disc brake according to claim 1, further comprising a second return spring that is a return spring different from the first return spring and provided between the housing and the frame.

\* \* \* \* \*